United States Patent [19]

Yeh

[11] Patent Number: 5,038,902
[45] Date of Patent: Aug. 13, 1991

[54] CLUTCH DEVICE FOR A TRANSMISSION WHEEL AND A TRANSMISSION SHAFT

[76] Inventor: Muh-Lin Yeh, 9-3, Alley 15, Lane 516, Wan Shou Rd., Sec. 1, Kuei Shan Hsiang, Taoyuan Hsien, Taiwan

[21] Appl. No.: 525,022

[22] Filed: May 18, 1990

[51] Int. Cl.⁵ .................. F16D 67/02; F16D 11/04
[52] U.S. Cl. ................. 192/17 C; 192/12 R; 192/36; 192/67 P; 192/93 A
[58] Field of Search ............... 192/12 R, 12 D, 17 R, 192/17 C, 36, 67 P, 93 A

[56] References Cited

U.S. PATENT DOCUMENTS

| | | | |
|---|---|---|---|
| 2,299,621 | 10/1942 | Giffen et al. | 192/17 R X |
| 2,492,284 | 12/1949 | Heim, Jr. | 192/12 R |
| 2,789,672 | 4/1957 | Forkner | 192/12 R X |
| 3,239,039 | 3/1966 | Burgett | 192/12 R |

Primary Examiner—Richard Lorence
Attorney, Agent, or Firm—Wenderoth, Lind & Ponack

[57] ABSTRACT

This invention relates to a clutch device for a transmission wheel and a transmission shaft. Two brake rings surround a hub axle and are contained in a brake hub. The first brake ring is intermediate the hub axle and the second brake ring and arranged so that, due to a time differential of braking by an external force on the two brake rings, a bevel canal in the first brake ring braces against a loose pin inserted in the hub axle, forcing the loose pin to part from the transmission wheel. This achieves the purpose of separating the transmission wheel and the transmission shaft in order to instantly stop the work done by the transmission shaft, and is particularly effective with common machine tools. It may be used with a magnetic solenoid or a manual trigger control, pre-regulating the bolts for the slackness and tightness of brake linings, to successive action with a proper time differential. Using the magnetic solenoid manual trigger as the brake control, the effect of separating the wheel and shaft is achieved by braking.

14 Claims, 3 Drawing Sheets

CLUTCH DEVICE FOR A TRANSMISSION WHEEL AND A TRANSMISSION SHAFT

BACKGROUND OF THE INVENTION (a) Field of the Invention

The present invention relates to a new design for the structure of a clutch device for a transmission wheel and transmission shaft. Two brake rings surround a hub axle contained in a brake hub. By utilizing the braking time differential of the two brake rings, one of the brake rings can force a loose pin to part from the transmission wheel so that idling, from the separation of the transmission wheel and transmission shaft, is achieved.

(b) Description of the Prior Art

There are many known clutch devices for transmission wheels and transmission shafts. To the common machine tools frequently seen, a clutch braking action is particularly important. It is particularly important in the operation of a punch press by a cam mechanism by a transmission wheel and a transmission shaft. In the punching process, it is necessary to start braking at the point of maximum elevation, and there is no way to brake instantly at any angle within a 360° range. In the event that a breakdown of the machine elements of the braking unit occurs, such as the break of a cotter, the drop of a pedal spring, etc., the punch press will fall off and cause an accident. If unable to brake in an emergency, there are often caused personal injuries (like broken fingers, etc.). At the present stage, although there are air compressors ready for control, the equipment costs are too high, and factories under scale cannot bear such an expense. Besides, if a safety valve does not work, an explosion might happen, similar to placing a bomb nearby, making workers uneasy. Aside from this, some electronic control mechanisms can be used for safety purposes, but these are not ideal, due to similar reasons of high cost and inconvenient maintenance.

SUMMARY OF THE INVENTION

The chief object of the present invention is to provide a new arrangement of a clutch device for a transmission wheel and a transmission shaft, utilizing an appropriate arrangement of two brake rings and a loose pin, so that the loose pin, coupled to the transmission wheel, can freely drive within the range of 360°, in coordination with a solenoid or a manual control, and thereupon instantly stop the running of the transmission wheel, in order to avoid the occurrence of any dangerous operational accidents.

Another object of the invention is to provide a simple combination of components, utilizing an appropriate structural design to achieve the effect of safe operation, and with the purpose of having a simple equipment arrangement, avoiding the burden of increased expenses for an expensive installation.

Based upon the above, the present invention provides a new arrangement of a clutch device for a transmission wheel and a transmission shaft. The coupling or separation between the transmission wheel and the transmission shaft achieves a state of transmission of rotation or a state of idling, respectively. When idling due to separation between the wheel and the shaft, the transmission shaft does not transmit rotation, and by a second braking action, the run is terminated, with the achievement of an expected braking action.

Structurally, the two brake rings surround a hub axle, and a spring is fixed between the two brake rings. The first brake ring has a bevel trough, and a rolling toggle joint is placed on a loose pin of the hub axle. A key block is used to securely couple the first brake ring and the hub axle. The slackness and tightness of two sets of brake linings in the brake hub is properly regulated so that they can first restrain the first brake ring, enabling the rolling toggle of the loose pin to take advantages of the relative twist motion of the two brake rings to roll along the bevel trough in the first brake ring and move into a corresponding concave groove in the second brake ring. The movement of the loose pin is a displacement stroke which causes the separation of the transmission wheel and the transmission shaft, and thus idling. Due to the close coordination of the time differential, the other brake lining stops the second brake ring, and further totally controls the rotation of the transmission shaft, thus braking the rotation.

DETAILED DESCRIPTION OF THE PREFERRED EMBODIMENT

Figure 1:
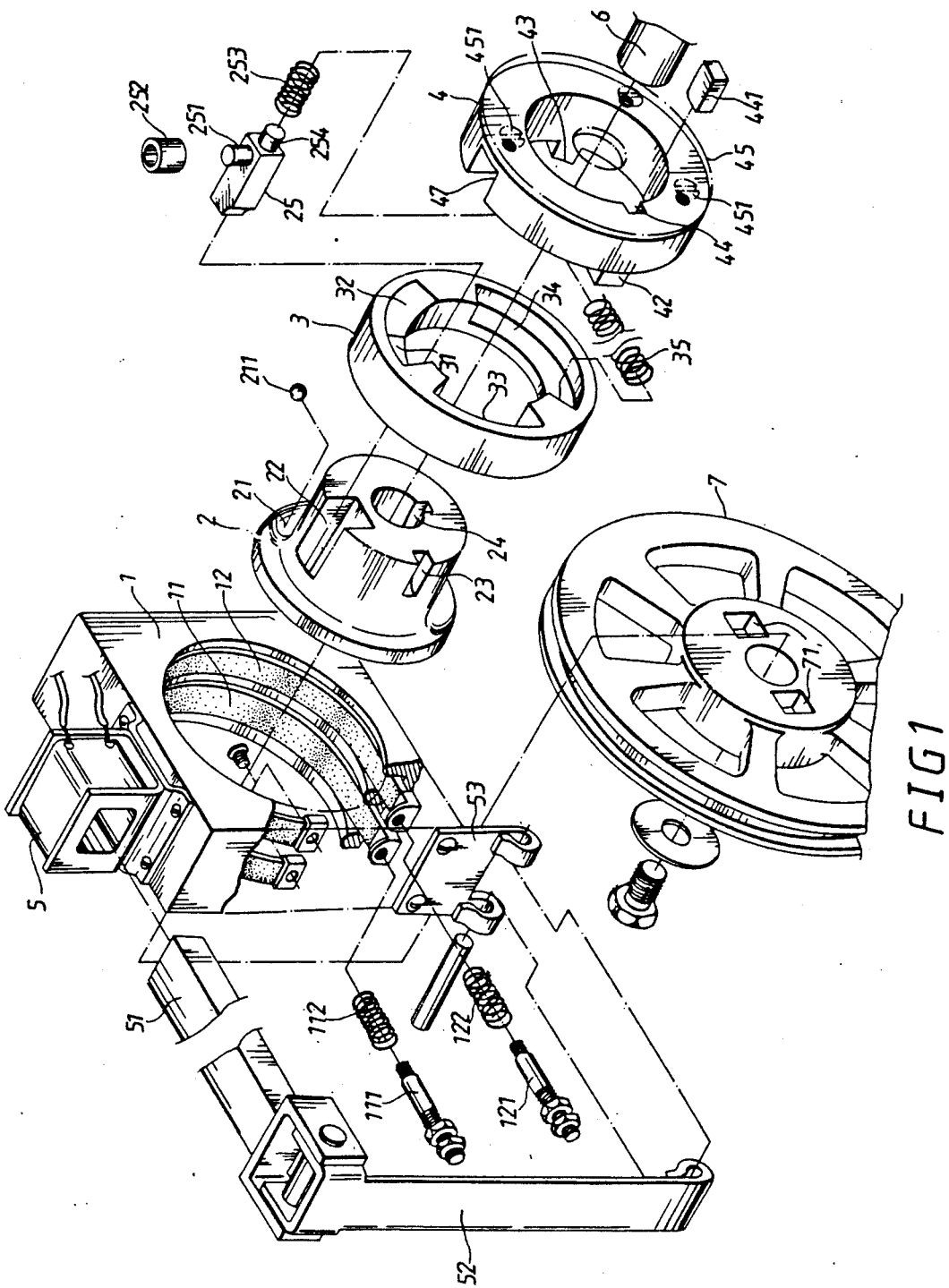
FIG. 1 is a schematic exploded view of a clutch device according to the invention.

As shown in FIG. 1, the structure of the invention includes, principally, a brake hub 1, a hub axle 2 and two sets of brake rings 3 and 4.

Figure 2:
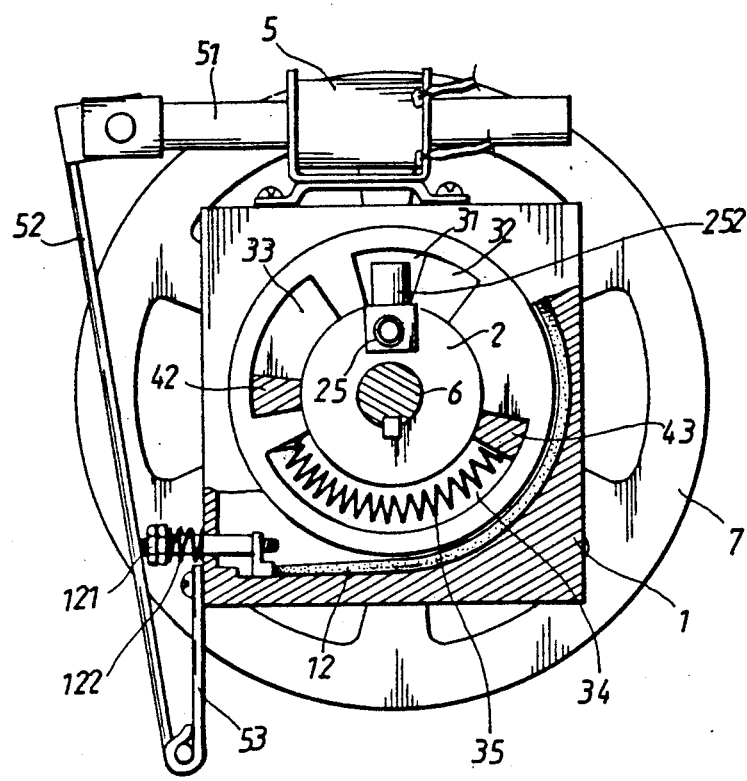
FIG. 2 is a sectional view of the clutch device according to the invention showing a state before braking.
Figure 3:
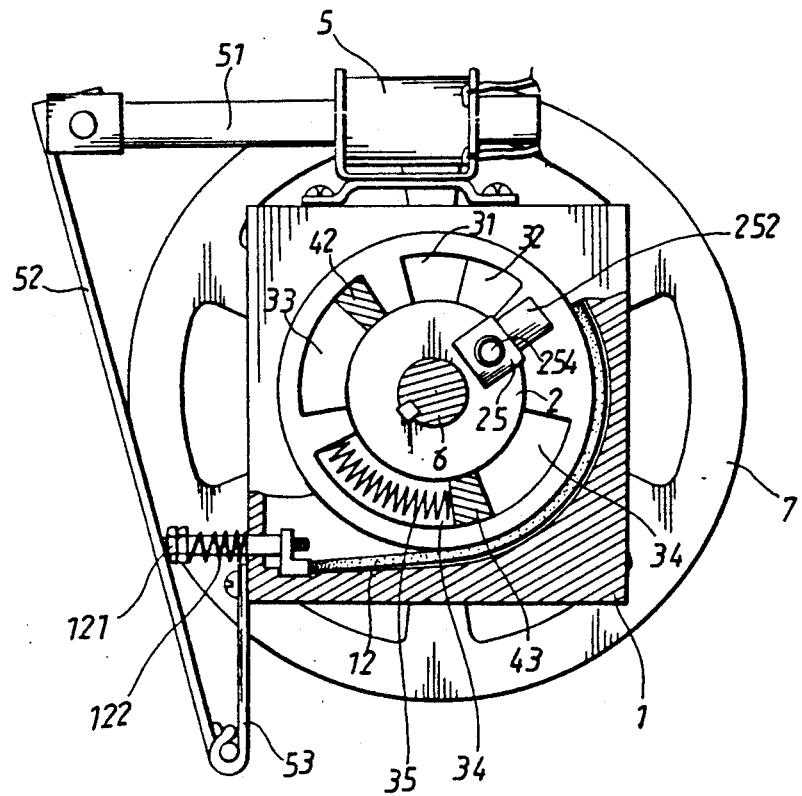
FIG. 3 is a sectional view of the clutch drive according to the invention showing a state after braking.

Brake hub 1 comprises two sets of brake linings 11 and 12, both of which have one end securely fixed to a hub wall with screws. The other end is engaged with external joined screw bolts 111 and 121, both of which separately pas through respective springs 112 and 122 to complete engagement. The screw bolts 111 and 121 can thus create appropriate changes of displacement by application of an external force to slacken and tighten the two sets of brake linings 11 and 12, respectively. According to this principle of braking control, the screw bolts 111 and 121 can be regulated separately with a solenoid 5 or a manual control means, as shown in the drawing, by using the solenoid 5 with a lever 51 operably connected thereto to control the driving of the pull arm 52. A coupling connects the lever 51 with the pull arm 52 for pivotal movement thereof. The end of the pull arm 52 pivotally connects with a fixed blade 53, which is fixed by a screw to the bottom of the external wall of the brake hub 1. When the solenoid 5 receives a signal to act, the lever 51 will be attracted or loosened to enable the pull arm 52 to create an action of pivotal displacement so that the braking effect may be achieved by the push of the pull arm 52 against the bolts 111 and 121, as illustrated in FIGS. 2 and 3.

Hub axle 2 is formed in a step ring body with a step column, which is provided to pass through and position the two brake rings 3 and 4. A ring groove 21 is formed in the end surface of the ring for containing a suitable quantity of steel balls 211 therein. A radially penetrating groove 22 and a key groove 23 open separately at selected positions on the step column. A fixed axle hole 24 extends through the ring body, and through this hole 24 a transmission shaft 6 is inserted and engaged with the ring body.

The first brake ring 3 of the two brake rings 3 and 4 has a ring shaped body, with an internal diameter equivalent to the external diameter of the step column of the hub axle 2 for precisely encasing the column. A concave groove 31 is fitted in the brake ring 3 for adaption to the penetrating groove 22 on the hub axle 2. On one side of the concave groove 31 is formed a bevel canal 32, and on its other side is fitted a cambered slot 33. On the side adjacent to the bevel canal 32, at a spaced distance, is also fitted a cambered key slot 34, which is in the vicinity of the cambered slot 33 at an adequate spaced distance. The cambered key slot 34 is provided for encasing a spring 35 of about the same length.

When the first brake ring 3 is placed on the hub axle 2, a loose pin 25 passes into the penetrating groove 22 of the hub axle 2. A circular protruding post 251 is fixed on one of the end surfaces of the loose pin 25, and is encased in a rolling toggle 252, which is the positioned in the concave groove 31 of the first brake ring 3. At the end of the loose pin 25 is a fixed post 254, provided for holding one end of a spring 253 in position so that the other end of the spring 253 may extend into a concave groove 41 fitted in the second brake ring 4, as described below, in an active state.

The second brake ring 4 of the two brake rings is also a ring shaped body, adapting to the concave groove 31 of the first brake ring 3 with the corresponding concave groove 41. Extended protruding blocks 42 and 43 correspond to and fit in the cambered slot 33 and the cambered key slot 34 at the front end of the first brake ring 3, respectively. The second brake ring 4 is successively placed on the hub axle 2 and rotates mutually and face-to-face with the first brake ring 3, having a definite limit of rotation, and the protruding block 43 protruding into the first brake ring 3 being buttressed by the spring 35. The second brake ring 4 provides a key slot 44 to correspond with the key groove 23 of the hub axle 2 so that the key slot 44 can be disposed aligned with the key groove 23 and secured by an assembling key 441. The end surface of the second brake ring 4 is closed by a circular lid 45 with screws 451 so that the assembling key 441 will not drop out and so that a nice appearance of the assembly will be maintained.

Referring to FIGS. 2 and 3, by utilizing the arrangement of the above components, the first and second brake rings 3 and 4 successively are placed on the hub axle 2, and the whole assembly is contained in the brake hub 1. The brake ring 4 is combined with the hub axle 2 due to its key slot 44 being engaged with the key groove 23 of the hub axle 2. The first brake ring 3 is not engaged with the hub axle 2, thus being in a rotatable state. However, the protruding block 42 of the second brake ring 4 is housed in the cambered slot 33 of the first brake ring 3 so that the first brake ring 3 is restricted by the protruding block 42 and allowed to rotate within the angular range of the protruding block 42 and the cambered slot 33. The first brake ring 3 is also buttressed by the protruding block 43, the spring 35 thus restoring a rotating action. When the two brake rings 3 and 4 rotate oppositely, the rolling toggle 252 rolls along the bevel canal 32 on the side of the concave groove 31 and further forces the loose pin 25 to displace, so that the loose pin 25 can move away from the position of a coupling slot 71 fitted on a transmission wheel 7 (see FIG. 1) and not be driven by the transmission wheel 7, thus enabling the transmission shaft 6 to be completely separated from the rotation transmission shaft 6 by braking of the rotation.

The braking control of the invention lies in regulating the slackness and tightness of the two brake linings 11 and 12 fitted in the hub axle 2. The brake lining 11, corresponding to the first brake ring 3, is set to a tightness a little greater than that of the brake lining 12 corresponding to the second brake ring 4, so that in braking, the first brake ring 3 initially drives, and by utilizing the relative twisting motion produced instantly from the two brake rings 3 and 4, forces the loose pin 25 to roll along the bevel canal 32 of the first brake ring 3. The loose pin 25 is pushed upwardly a predetermined distance to separate the loose pin 25 from the coupling slot 71 of the transmission wheel 7, leaving the transmission wheel 7 to idle. From the effect of inertia the second brake ring 4 remains rotating, so right after the relative twisting motion the brake lining 12 is utilized to stop the second brake ring from rotating, thus using the instant time differential to overcome the inertia effect.

The above described drive control can either be controlled by hand or by a solenoid. As illustrated in this working example, the solenoid 5 is used for the driving control by pulling arm 52 to manipulate the bolts 111 and 121 of the brake linings 11 and 12 by holding shaft 51 tightly (as shown in FIG. 2) or by loosening shaft 51 (as shown in FIG. 3) in order to create the idle running state of the transmission wheel 7. The driving control can be replaced by a hand control, depending upon the requirements of the equipment.

Figure 4:
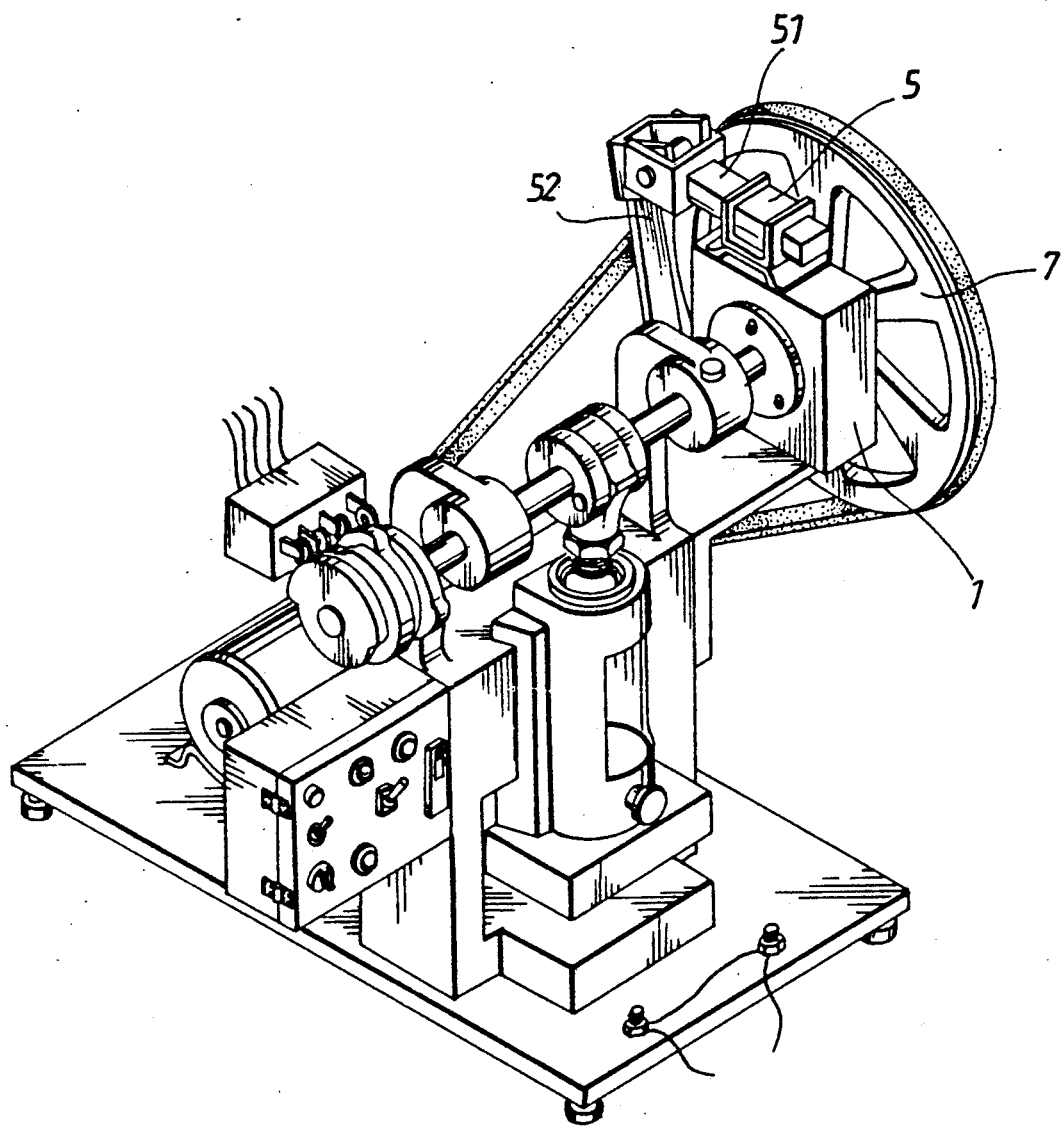
FIG. 4 is a schematic view of the clutch device according to the invention with a punch press.

As shown in FIG. 4, the working example of the invention is applied to a punch press. According to the structural design, the brake hub 1 can be started to run at any angle (within the range of 360°), enabling the change from idle running between the transmission wheel and transmission shaft and the stoppage of the punching action of the punch press in order to have a more ideal position to stop running and to protect personal safety. The improved driving effect is achieved merely by the arrangement of simple elements, moreover, having the same functions without the help of safety equipment, like an air compressor. Therefore the present invention offers great contributions to the savings of equipment expenses, as compared with other known punch presses, which must control the braking at their highest point, and application of the invention is particularly practical and safe.

I claim:

1. A clutch device for a transmission wheel and a transmission shaft, comprising:
   a hub axle having an axle hole therethrough for connection to the transmission shaft and a coupling means for detachably coupling said hub axle with the transmission wheel;
   a first brake ring rotatably mounted on said hub axle, said first brake ring comprising an engaging means for engaging said coupling means of said hub axle and detaching said coupling means from the transmission wheel upon relative rotation of said first brake ring and said hub axle;
   a second brake ring rotatably fixed with and mounted on said hub axle;
   braking means for braking said first brake ring to cause relative rotation between said first brake ring and said hub axle to cause said engaging means to detach said coupling means from the transmission wheel and for subsequently braking said second brake ring to stop rotation of said second brake ring, said hub axle and the transmission shaft.

2. The clutch device of claim 1 wherein said braking means comprises a brake hub body having first and second brake linings mounted thereon for engagement with said first and second rings, respectively, means for causing said brake linings to engage said brake rings, and means for adjusting the tightness of said brake linings on said brake rings when said brake linings are engaged with said brake rings, and wherein said first brake lining is adjusted to be tighter then said second brake lining.

3. The clutch device of claim 2 wherein:
said brake linings have one end each fitted to said brake hub body;
said means for adjusting the tightness of said brake linings comprises a pair of external screw bolts connected to the other ends of the respective said brake linings; and
said means for causing said brake linings to engage said brake rings comprises a lever mechanism in engagement with said screw bolts.

4. The clutch device of claim 3 wherein:
said external screw bolts are movably disposed relative to said brake hub body, having a spring each biasing said screw bolts; and
said lever mechanism comprises a lever engaging said screw bolts and a solenoid having a moving member coupled to said lever for movement of said lever.

5. The clutch device of claim 1 wherein:
said first and second brake rings comprise limiting means for limiting the relative rotation of said first brake ring relative to said hub axle.

6. The clutch device of claim 5 wherein said limiting means comprises a cambered slot in said first brake ring and a protruding block protruding from said second brake ring disposed in said cambered slot.

7. The clutch device of claim 6 wherein said first brake ring further comprises a cambered key slot having ends thereof, and said second brake ring further comprises a second protruding block disposed in said cambered key slot, a spring being disposed between one end of said cambered key slot and said second protruding block.

8. The clutch device of claim 1 wherein said first brake ring further comprises a cambered key slot having ends thereof, and said second brake ring further comprises a second protruding block disposed in said cambered key slot, a spring being disposed between one end of said cambered key slot and said second protruding block.

9. The clutch device of claim 1 wherein:
said hub axle comprises a ring member having a central column extending therefrom, said first brake ring being disposed on said column;
said coupling means comprises a radially extending groove in said column and a loose pin disposed in said radially extending groove for movement therein.

10. The clutch device of claim 9 wherein:
said coupling means further comprises a post protruding from said loose pin and a rolling toggle on said post; and
said engagement means comprises a groove extending through said first brake ring for receiving said rolling toggle therein and a bevelled channel adjacent said groove for engaging said rolling toggle to move said loose pin in said radially extending groove.

11. The clutch device of claim 10 wherein:
said second brake ring has a groove therein aligned with said radially extending groove in said column for receipt of said rolling toggle therein upon movement of said rolling toggle by said bevelled channel.

12. The clutch device of claim 10 wherein a spring is disposed to bias said loose pin toward a transmission wheel engaging position.

13. The clutch device of claim 1 wherein:
said hub axle comprises a ring member having a central column extending therefrom, said first brake ring being disposed on said column, and
a ring groove is formed on said ring member and a plurality of steel balls are disposed in said ring groove between said ring member and said first brake ring for enabling rotation of said first brake ring relative to said hub axle.

14. The clutch device of claim 1 wherein:
said hub axle comprises a ring member having a central column extending therefrom;
said column has a key groove therein;
said second brake ring has a key slot therein; and
said second brake ring is rotatably fixed with said hub axle by an assembling key in said key groove and said key slot.

* * * * *